United States Patent
Lin et al.

(10) Patent No.: US 12,164,960 B1
(45) Date of Patent: Dec. 10, 2024

(54) DATABASE-BASED DATA PROCESSING METHOD, DEVICE, MEDIUM AND ELECTRONIC APPARATUS

(71) Applicants: DOUYIN VISION CO., LTD., Beijing (CN); LEMON INC., Grand Cayman (KY)

(72) Inventors: Yuanjin Lin, Beijing (CN); Wei Ding, Los Angeles, CA (US)

(73) Assignees: DOUYIN VISION CO., LTD., Beijing (CN); LEMON INC., Grand Cayman (KY)

( * ) Notice: Subject to any disclaimer, the term of this patent is extended or adjusted under 35 U.S.C. 154(b) by 0 days.

(21) Appl. No.: 18/737,810

(22) Filed: Jun. 7, 2024

(30) Foreign Application Priority Data

Jul. 4, 2023 (CN) .......................... 202310813833.9

(51) Int. Cl.
*G06F 9/46* (2006.01)
*G06F 9/48* (2006.01)

(52) U.S. Cl.
CPC ............ *G06F 9/4887* (2013.01); *G06F 9/485* (2013.01)

(58) Field of Classification Search
CPC ............................... G06F 9/4887; G06F 9/485
See application file for complete search history.

(56) References Cited

FOREIGN PATENT DOCUMENTS

CN        112346835 A        2/2021

*Primary Examiner* — Gregory A Kessler
(74) *Attorney, Agent, or Firm* — BakerHostetler (57) ABSTRACT

The present disclosure relates to a database-based data processing method, device, medium and electronic apparatus, the method including: receiving a query request task to be executed, and determining a plurality of coroutine tasks corresponding to the query request task; in each thread, determining a target coroutine task to be executed according to time information of each coroutine task in the local task queue of the thread; interrupting the target coroutine task and adding the target coroutine task to the global task queue when execution of the target coroutine task is not completed and the target coroutine task has been executed in the thread for a current time slice; according to the global task queue, and the local task queue of the thread, determining a new target coroutine task for the thread, and executing the new target coroutine task in a next time slice.

20 Claims, 5 Drawing Sheets

Receiving a query request task to be executed, and determining a plurality of coroutine tasks corresponding to the query request task — 11

In each thread, determining a target coroutine task to be executed according to time information of each coroutine task in the local task queue of the thread — 12

Interrupting the target coroutine task and adding the target coroutine task to the global task queue when execution of the target coroutine task is not completed and the target coroutine task has been executed in the thread for a current time slice — 13

According to the global task queue, and the local task queue of the thread, determining a new target coroutine task for the thread, and executing the new target coroutine task in a next time slice — 14

DATABASE-BASED DATA PROCESSING METHOD, DEVICE, MEDIUM AND ELECTRONIC APPARATUS

CROSS REFERENCE TO RELATED APPLICATION

This application claims priority from Chinese Patent Application No. 202310813833.9, filed on Jul. 4, 2023, the contents of which are hereby incorporated by reference in their entirety for all purposes.

TECHNICAL FIELD

The present disclosure relates to the field of computer, and in particular, a database-based data processing method, device, medium and electronic apparatus.

BACKGROUND ART

Under the current database architecture, an SQL request will generate an execution plan after being processed by a Query Optimizer and a Planner, and finally it will be submitted to an Execution Engine for specific calculation. In the related art, the Execution Engine mainly consists of multiple operators (for example, Join operator and Shuffle operator) and an Executor that drives the data to circulate among the operators, and execution flow of the operators in the Executor has great influence on the execution of SQL statement.

SUMMARY OF THE INVENTION

This portion of summary of the invention is provided to introduce a selection of concepts in a simplified form that are further described below in the portion of the preferred embodiments. This portion of summary is not intended to identify key features or essential features of the claimed subject matter, nor is it intended to be used to limit the scope of the claimed subject matter.

In one aspect, the present disclosure provides a database-based data processing method, which method includes:
  receiving a query request task to be executed, and determining a plurality of coroutine tasks corresponding to the query request task, wherein the coroutine tasks are first added to a global task queue shared by a plurality of threads, and then distributed to a local task queue of a corresponding thread from the global task queue;
  in each thread, determining a target coroutine task to be executed according to time information of each coroutine task in the local task queue of the thread;
  interrupting the target coroutine task and adding the target coroutine task to the global task queue when execution of the target coroutine task is not completed and the target coroutine task has been executed in the thread for a current time slice;
  according to the global task queue, and the local task queue of the thread, determining a new target coroutine task for the thread, and executing the new target coroutine task in a next time slice.

In another aspect, the present disclosure provides a database-based data processing device, which device includes:
  a receiving module configured to receive a query request task to be executed, and determine a plurality of coroutine tasks corresponding to the query request task, wherein the coroutine tasks are first added to a global task queue shared by a plurality of threads, and then distributed to a local task queue of a corresponding thread from the global task queue;
  a first determining module configured to, in each thread, determine a target coroutine task to be executed according to time information of each coroutine task in the local task queue of the thread;
  a processing module configured to interrupt the target coroutine task and add the target coroutine task to the global task queue when execution of the target coroutine task is not completed and the target coroutine task has been executed in the thread for a current time slice;
  a second determining module configured to, according to the global task queue, and the local task queue of the thread, determine a new target coroutine task for the thread, and executing the new target coroutine task in a next time slice.

In another aspect, the present disclosure provides a computer-readable medium on which a computer program is stored, which, when executed by a processing device, implements steps of the method described in the first aspect.

In another aspect, the present disclosure provides an electronic apparatus, including:
  a storage device on which a computer program is stored;
  a processing device for executing the computer program in the storage device to implement steps of the method in the first aspect.

Other features and advantages of the present disclosure will be described in detail in the portion of the preferred embodiments that follows.

BRIEF DESCRIPTION OF THE DRAWINGS

The above and other features, advantages and aspects of embodiments of the present disclosure will become more apparent by referring to the following preferred embodiments in conjunction with the accompanying drawings. Throughout the drawings, identical or similar reference numerals denote identical or similar elements. It should be understood that the drawings are schematic, and units and elements are not necessarily drawn to scale. In the drawings.

DETAILED DESCRIPTION OF PREFERRED EMBODIMENTS

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are used only for illustrative purposes, and are not used to limit the protection scope of the present disclosure.

It should be understood that steps described in the method embodiments of the present disclosure may be executed in different sequences and/or in parallel. Further, method embodiments may include additional steps and/or omit execution of illustrated steps. Scope of the present disclosure is not limited in this respect.

As used herein, the term "comprising" and its variants are open-ended including, that is, "including but not limited to". The term "based on" is "at least partially based on". The term "one embodiment" means "at least one embodiment"; the term "another embodiment" means "at least one other embodiment"; the term "some embodiments" means "at least some embodiments". Related definitions of other terms will be given in the below description.

It should be noted that such concepts as "first", "second" etc. mentioned in the present disclosure are only used to distinguish different devices, modules or units, and are not used to limit the order or interdependence of functions performed by these devices, modules or units.

It should be noted that such modifiers as "a" and "a plurality" mentioned in this disclosure are schematic rather than limiting, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

It can be understood that before using the technical solutions disclosed in various embodiments of the present disclosure, users should be informed of the types, scope of use, use scenes, etc. of personal information involved in the present disclosure in an appropriate way according to relevant laws and regulations and be authorized by users.

For example, in response to receiving an active request from the user, prompt information is sent to the user to clearly remind the user that the operation requested by the user will require obtaining and using the personal information of the user. Therefore, the user can independently choose whether to provide personal information to software or hardware such as electronic devices, applications, servers or storage media that perform the operation of the technical solution of the present disclosure according to the prompt information.

As an optional but non-limiting implementation, in response to receiving the active request from the user, the way to send the prompt information to the user can be, for example, a pop-up window, in which the prompt information can be presented in text. In addition, the pop-up window can also carry a selection control for the user to choose "agree" or "disagree" to provide personal information to the electronic device.

It can be understood that the above process of notifying and obtaining user authorization is only schematic, and does not limit the implementation of the present disclosure. Other ways to meet relevant laws and regulations can also be applied to the implementation of the present disclosure.

At the same time, it can be understood that the data involved in this technical solution (including but not limited to the data itself, data acquisition or use) should comply with the requirements of corresponding laws, regulations and relevant regulations.

Figure 1:
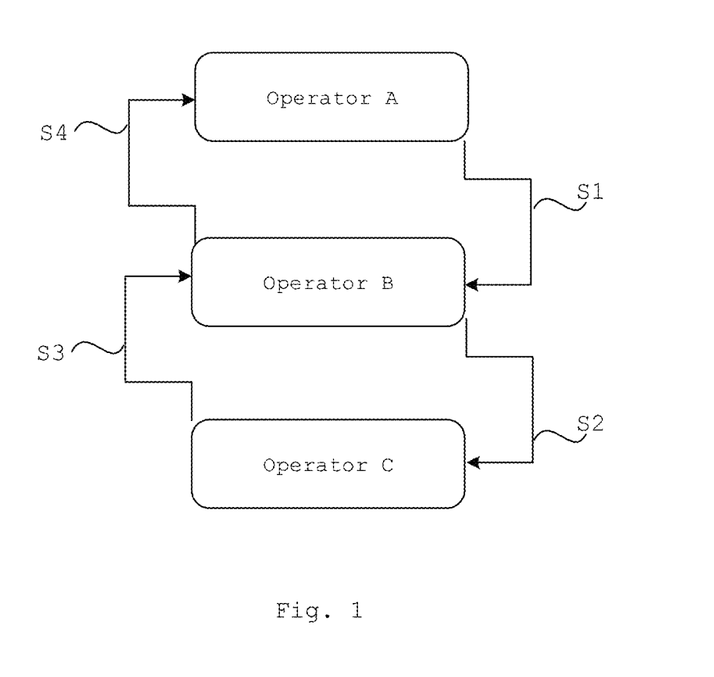
FIG. 1 is a schematic flow chart of an executor executing operators with a Volcano model.

The applicant finds out in research that in the related art, when the executor circulates the operator, it usually has the following manners:

A first manner: a Volcano model (Pull model). In the execution engine of the Volcano model, each operator will be abstracted into an iterator. Each iterator implements a Next method. Each call to this Next method will return the data obtained by this operator. The execution engine obtains all the results of the entire query by constantly calling the Next method at a root node of a calculation tree of the query statement SQL. As shown in FIG. 1, operator A has to go through four steps to get a row of data of downstream operator B: S1: calling B.Next ( ), S2: calling C.Next ( ), S3: returning C.Next ( ), and S4: returning B.Next ( ).

Figure 2:
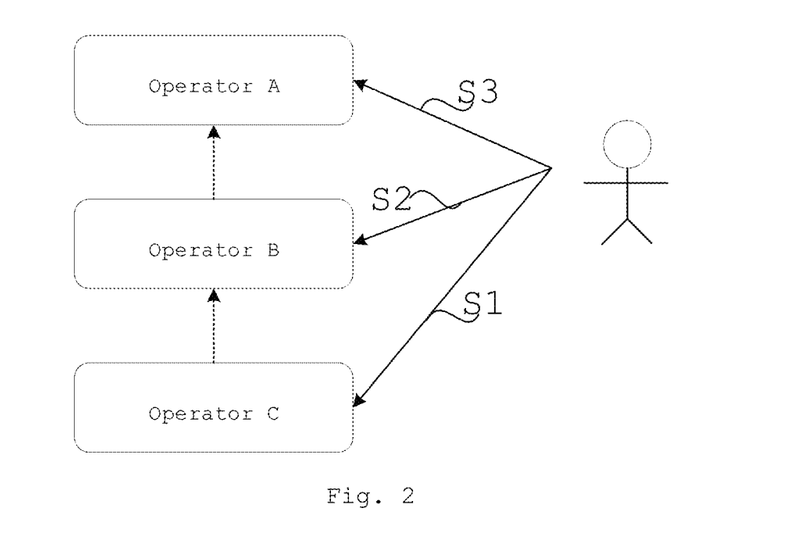
FIG. 2 is a schematic flow chart of an executor executing operators with a Push model.

A second manner: a Push model in which each operator only implement its own data transformation method, and the data flow is pushed by an external caller from bottom to top. As shown in FIG. 2, S1, S2 and S3 each call work ( ) to push the data flow between different operators, and there is no mutual calling relationship between operators.

Figure 3:
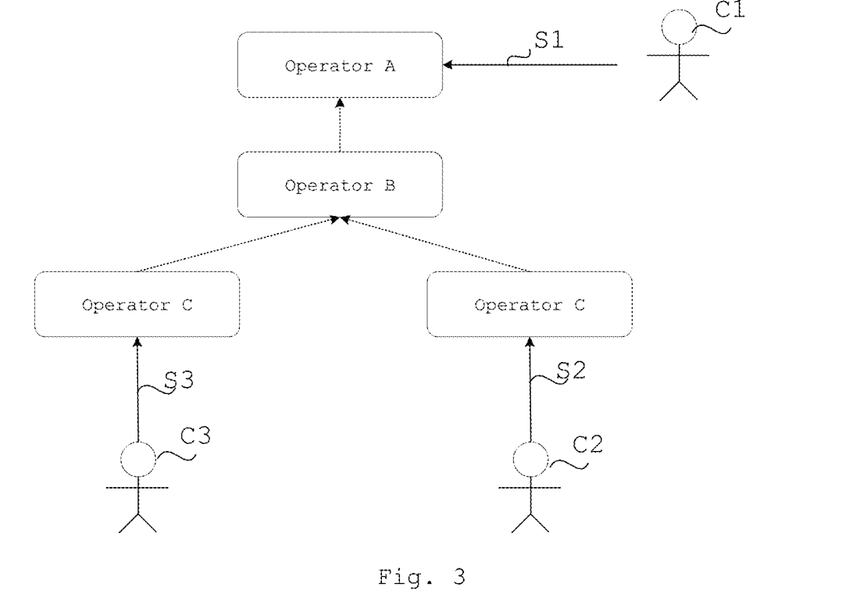
FIG. 3 is a schematic flow chart of an executor executing operators with a DAG pipeline model.
Figure 4:
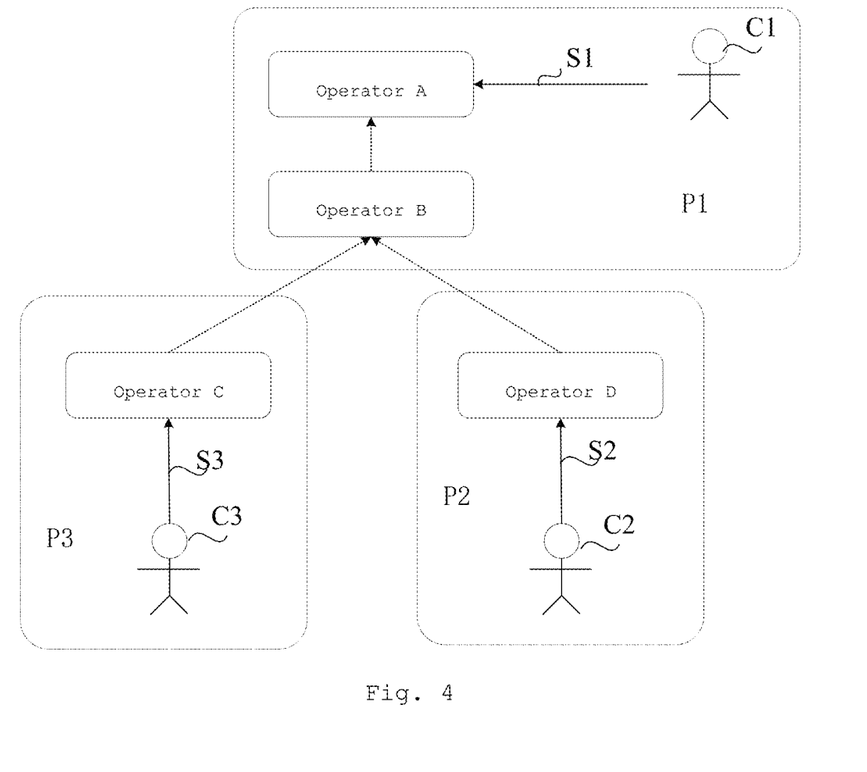
FIG. 4 is a schematic flow chart of an executor executing operators with a segmented pipeline model.

A third manner: a pipeline model. In DAG (Directed Acyclic Graph) pipeline model, operators are abstracted into a DAG, and each thread can perform the task of any node (i.e. operator) in DAG. As shown in FIG. 3, threads C1, C2 and C3 can respectively execute S1: call A.Work ( ), S2: D.work ( ) and S3: C.work ( ) to achieve the effect of parallel execution. In the segmented pipeline model, it is segmented on the basis of DAG pipeline model, so that each operator in the segment will be executed by the same thread, and each thread can only execute the operator on its corresponding segment. Data between segments is exchanged through message queues. As shown in FIG. 4, there are three segments P1-P3 included. Thread C3 can only execute operator C, thread C2 can only execute operator D, thread C1 can execute operator A or operator B. According to the execution logic as shown in FIG. 4, threads C1, C2 and C3 can execute S1: call A.Work ( ), S2: D.work ( ) and S3: C.work ( ) respectively.

However, according to the above manners, the Volcano model and the Push model cannot execute the corresponding physical plans in parallel, so that it is difficult to be applied to SQL request processing with complex and large data scale. However, in the DAG pipeline model, each thread may try to execute any operator on the DAG, and there may be multiple threads trying to execute the same operator. In response of this, a locking mechanism will be introduced. In a system with a large amount of data or a large number of cores, there will be a large lock conflict overhead. And if two threads execute interrelated upstream and downstream operators at the same time, the downstream operator cannot continue to execute the upstream operator after the execution is completed, and the currently processed data can only be handed over to another thread that is executing the upstream operator. Cross-thread data exchange will destroy the cache locality of CPU (Central Processing Unit). The segmented pipeline model is difficult to control the system thread and CPU resource occupation and make resource isolation to the request. At the same time, a large number of system-level threads will also bring pressure to the task scheduling of the operating system and slow down the execution speed of the overall SQL request. Based on this, the present disclosure provides the following embodiments.

Figure 5:
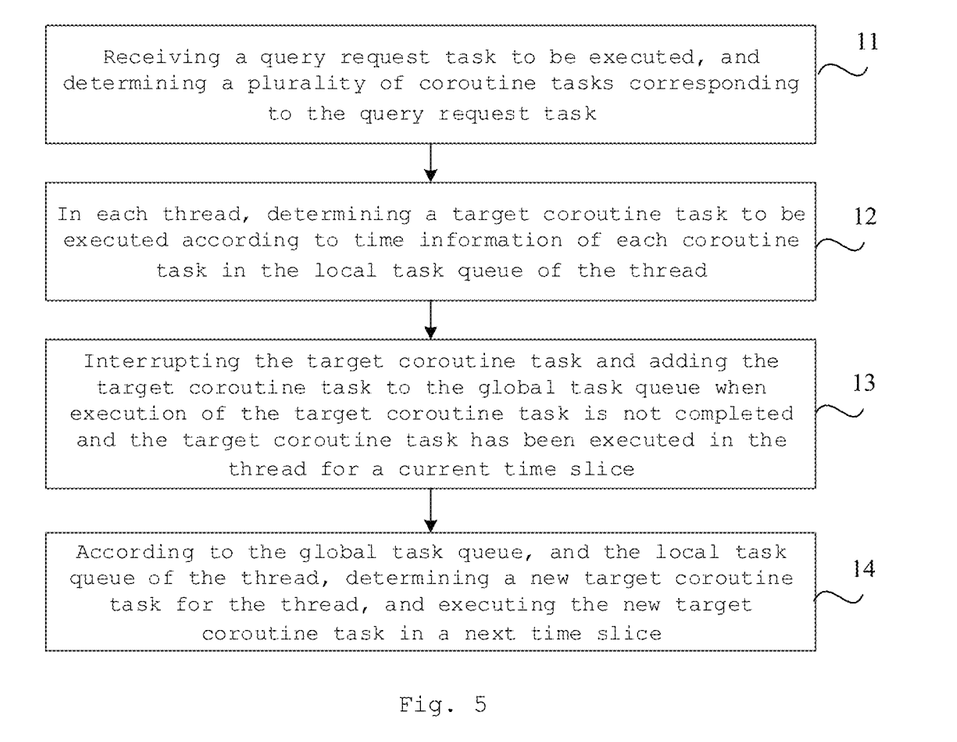
FIG. 5 is a flow chart of a database-based data processing method provided according to an embodiment of the present disclosure.

FIG. 5 is a flow chart of a database-based data processing method provided according to an embodiment of the present disclosure.

As shown in FIG. 5, the method may include:

in step 11, a query request task to be executed is received, and a plurality of coroutine tasks are determined corresponding to the query request task, wherein the coroutine tasks are first added to a global task queue shared by a plurality of threads, and then distributed to a local task queue of a corresponding thread from the global task queue.

Coroutine is a program component, which can be logically understood as a lightweight thread or an interruptible function with an independent runtime context. When running a coroutine task on the thread, after execution of the coroutine task is completed or interrupted, one can choose to give up actively to have another coroutine task to run on the current thread. In an embodiment of the present disclosure, the query request task to be executed can be divided to obtain a plurality of coroutine tasks corresponding to the query request task, and after execution of the coroutine tasks is completed, the query request task is completed.

In this embodiment, the divided coroutine tasks can be scheduled and executed through two-level queues, wherein each thread can have its corresponding local task queue, which can be configured to store the coroutine tasks that the thread needs to execute, and there is also a global task queue shared by the multiple threads, which is configured to distribute and schedule the coroutine tasks for the local task queue of each thread.

In step 12, in each thread, a target coroutine task to be executed is determined according to time information of each coroutine task in the local task queue of the thread.

Wherein, the time information of the coroutine task can be distribution time when the coroutine task is distributed to the local task queue, then when determining the target coroutine task to be executed, the coroutine task with the earliest time information in the local task queue can be determined as the target coroutine task, so that the thread can execute the coroutine task in the local task queue according to the FIFO (First Input First Output) rule.

In step 13, the target coroutine task is interrupted and the target coroutine task is added to the global task queue when execution of the target coroutine task is not completed and the target coroutine task has been executed in the thread for a current time slice.

Wherein, duration of the time slice can be set according to the actual application scene, which is not limited by the present disclosure. After determining the target coroutine task, the target coroutine task can be run on the current thread. After being executed for a time slice, if the target coroutine task has not been completed, it needs here to interrupt the target coroutine task and add it to the global task queue, so that the target coroutine task can be rescheduled in a subsequent time slice, and then execution of the target coroutine task can be completed.

In this embodiment, multiple threads share the global task queue, that is, the coroutine task in each thread, execution of which is yet to be completed, will be re-added to the same global task queue after interruption, and re-scheduled until execution of the coroutine task is completed. If execution of the target coroutine task is completed in the current time slice, the target coroutine task can be completed without being added to the global task queue.

In step 14, according to the global task queue, and the local task queue of the thread, a new target coroutine task for the thread is determined, and the new target coroutine task is executed in a next time slice.

Wherein, the local task queue of a thread includes coroutine tasks that the thread needs to execute, and the global task queue includes coroutine tasks to be scheduled to multiple threads, a new target coroutine task can be determined from the coroutine tasks that need to be executed, so as to run another coroutine task on the thread so as to run multiple coroutine tasks on one thread.

According to said technical solution, a plurality of coroutine tasks corresponding to a query request task to be executed are determined, so that multiple coroutine tasks can be scheduled and executed on an existing thread, and two-level scheduling is carried out through a global task queue and a local task queue of the thread, and each coroutine task in the thread is interrupted after being executed for a time slice to further execute another coroutine task, so that parallel execution of multiple coroutine tasks can be supported, an accurate and reasonable execution flow can be provided for execution of the query request task, and concurrency and efficiency of task execution can be improved. Meanwhile, a user-state coroutine can be used to simulate threads to implement the task execution flow, so that it can be applied to scenes with fewer threads, realizing resource reuse, and further expanding application scenes of the data processing method of the present disclosure. In addition, according to said technical solution, while improving the efficiency of task execution, additional resource occupation and overhead can be avoided, thus ensuring the utilization rate of system resources.

In a possible embodiment, an exemplary implementation of determining a plurality of coroutine tasks corresponding to the query request task may include:

parsing the query request task and determining a plurality of operators corresponding to the query request task.

Figure 6:
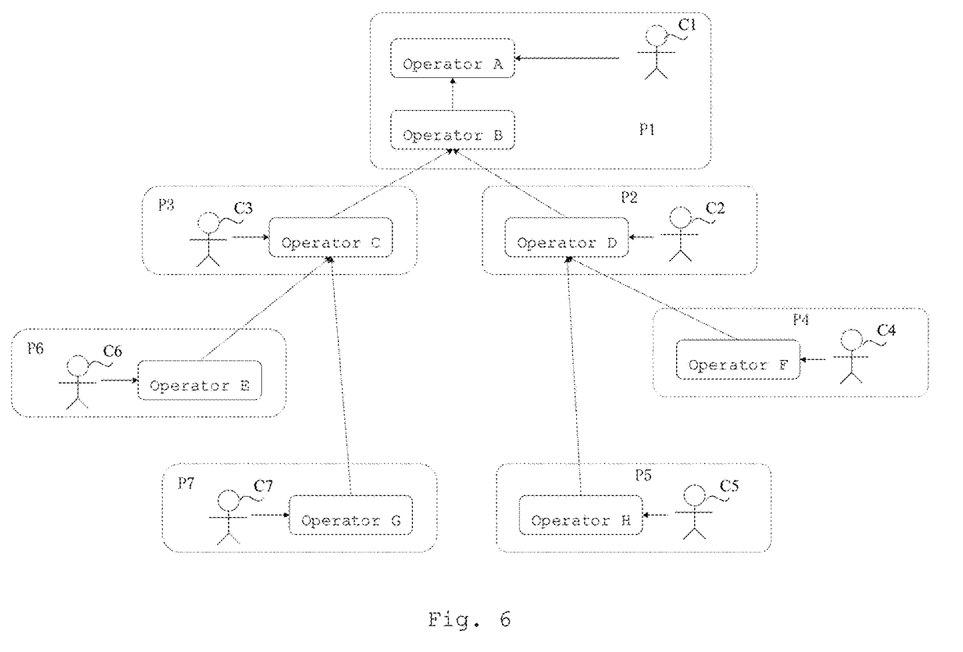
FIG. 6 is a schematic diagram of segmentation in a database-based data processing method provided according to an embodiment of the present disclosure.

Wherein, the query request task can be a task requested by SQL, which is configured to query from a corresponding database. For example, the query request task can be parsed to determine operators included therein. Specific execution process of an SQL statement can be divided into different execution steps according to different SQL statement, and each step usually include one or more SQL operators, which can represent specific actions of each step in the execution process of the SQL statement, such as but not limited to Select, From, Join, Group by, Having, etc. For example, it can be determined based on the SQL operator parsing method of the SQL statement in the art to obtain a plurality of operators corresponding to the query request task. As shown in FIG. 6, the operator corresponding to the query request task may include operators A-H.

For each operator, if the operator has multiple input operators, the operator and the input operators are divided into different coroutine tasks; and if the operator has one input operator, the operator and the input operator are divided into the same coroutine task.

As shown in FIG. 6, arrows between operators are used to indicate execution directions. Taking operator A as an example, wherein the input operator of operator A is operator B, that is, operator A has only one input operator, then operators A and B can be divided into the same coroutine task. The input operator of operator B is operator C and operator D, that is, operator B has multiple input operators, operators B, C and D can then be divided into different coroutine tasks. By analogy, operators A-H can be divided into seven coroutine tasks, such as coroutine tasks C1-C7 as shown in FIG. 6.

As so, according to said technical solution, the query request task can be parsed to generate a plurality of coroutine tasks, and the query request task can be segmented to be executed in parallel to a determined extent, and the multiple coroutine tasks can be run in a few threads to improve execution efficiency of the query request task.

In one possible embodiment, the target coroutine task can be added to the global task queue by:

determining a cumulative execution time of the target coroutine task and a quota of CPU resources corresponding to the target coroutine task.

Wherein, the cumulative execution time can be determined by scheduling times and time slices of the target coroutine task, for example, the product of the scheduling times and time slices can be taken as the cumulative execution time. The quota of CPU resources can be determined based on the priority of the requester of the query request task corresponding to the coroutine task, and the quotas corresponding to different priorities can be set in advance, so that the corresponding quota can be determined according to the priority of the query request task corresponding to the target coroutine task. The quota can be a number of cores of CPU used, and the higher the priority, the more the number of cores of CPU used by the coroutine task.

An execution parameter of the target coroutine task is determined according to the cumulative execution time and the quota.

Wherein, the cumulative execution time can be configured to represent scheduling times of the coroutine task. More cumulative execution time means that the coroutine task has been executed many times, then, the corresponding priority should be lowered and the execution parameter should be smaller. More quota means that more resources are available to execute the coroutine task, and the corresponding execution parameter should be smaller. For example, the ratio of the cumulative execution time to the quota can be determined as the execution parameter, so that it can be comprehensively considered from two aspects: the execution time of the coroutine task itself and the configuration of the coroutine task itself, so as to ensure fairness in the scheduling process of the coroutine task to a determined extent and ensure the smoothness and rationality of task execution.

Thereafter, the target coroutine task can be added to the global task queue according to the execution parameter.

Figure 7:
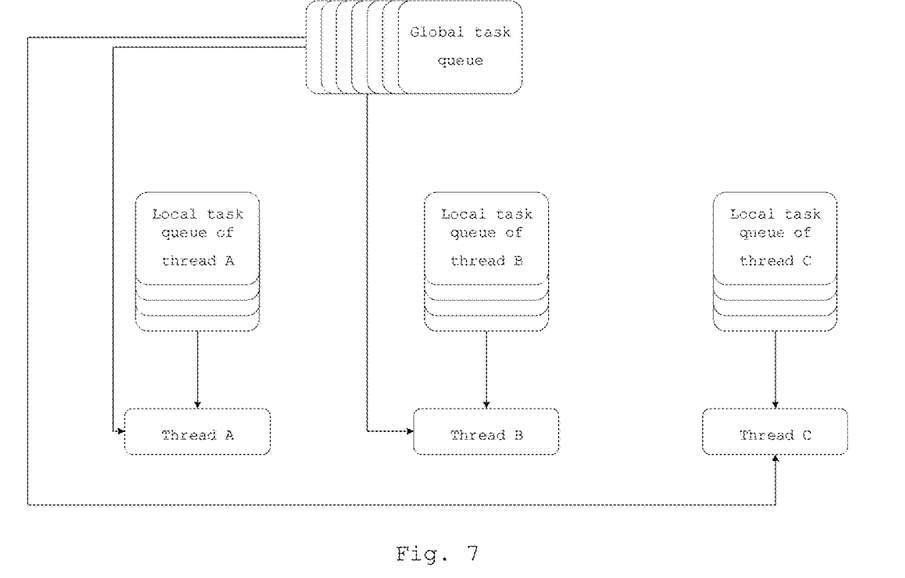
FIG. 7 is a schematic diagram of a global task queue and a local task queue provided according to an embodiment of the present disclosure.

Wherein, a numeric value of the execution parameter can be used to indicate the execution priority of coroutine tasks, so that each coroutine task in the global task queue can be arranged according to the order from small to large, and when adding the target coroutine task into the global task queue, it can be inserted according to the execution parameter of the target coroutine task, so that the execution parameters of coroutine tasks in the inserted global task queue are still arranged according to the order from small to large. FIG. 7 is a schematic diagram of a global task queue and a local task queue provided according to an embodiment of the present disclosure.

As an example, the global task queue can be implemented by a red-black tree structure, and the red-black tree is a self-balanced binary search tree. When inserting and deleting, balance of the binary search tree is maintained by specific operations, thus improving the search performance, facilitating rapid and accurate insertion of target coroutine tasks, and ensuring accuracy of global task queue sequencing. Wherein, the red-black tree structure can be implemented based on methods commonly used in the art, and will not be described in detail here.

Therefore, according to said technical solution, the scheduling priority of the target coroutine task can be considered according to the cumulative execution time, the quota of CPU resources, and so on, so as to ensure accuracy and rationality of the execution parameter to a determined extent, provide accurate data support for the subsequent scheduling of coroutine tasks in the global task queue based on the execution parameter, ensure fairness of coroutine task scheduling, and further improve efficiency of task execution.

In a possible embodiment, implementation of the determining a new target coroutine task for the thread according to the global task queue, and the local task queue of the thread, may include:

if there is a coroutine task in the local task queue of the thread, the coroutine task with the earliest distribution time in the local task queue is taken as the new target coroutine task;

if there is no coroutine task in the local task queue of the thread, applying for a coroutine task from the global task queue to the local task queue, and determining the new target coroutine task from the local task queue with applied coroutine task.

In this embodiment, if a thread has a corresponding local task queue, the thread can preferentially consume the coroutine task in the local task queue when consuming, that is, when there is a coroutine task in the local task queue of the thread, a new target coroutine task can be directly determined from the local task queue. After consumption of the coroutine task in the local task queue is completed, consuming from the global coroutine task queue, that is, if there is no coroutine task in the local task queue of the thread, applying for a new coroutine task from the global queue and then executing it.

In one possible embodiment, coroutine tasks in the global task queue are arranged in a sequence from high priority to low priority according to the execution priority. As mentioned above, the execution priority can be represented by an execution parameter, and the smaller the execution parameter, the higher the execution priority, that is, the coroutine tasks in the global task queue can be sequenced from small to large according to their execution parameters, and the coroutine tasks with small execution parameters are given priority for distribution and execution.

Accordingly, implementation of the applying for a coroutine task from the global task queue to the local task queue may include: sending a coroutine task request to the global task queue, wherein the coroutine task request includes the number of applications.

Wherein, a thread can have a corresponding scheduler configured to schedule coroutine tasks in the local task queue of the thread. Then, in response to that the local task queue of the thread is empty, sending a coroutine task request to the global task queue so as to distribute a coroutine task from the global task queue to the local. For example, the global task queue may have correspondingly a global scheduler to schedule coroutine tasks in the global task queue. As an example, for a newly received query request task, a corresponding coroutine task thereof can be first added to the global task queue, then it can be distributed from the global task queue to the local task queue of multiple threads for execution based on random distribution, and then it can be further added to the global task queue for subsequent distribution based on the method mentioned above.

Adding the coroutine task distributed from the global task queue in response to the coroutine task request to the local task queue, wherein the distributed coroutine task includes coroutine tasks with the number of applications selected sequentially based on the sequence in the global task queue.

Wherein, when the global scheduler receives the coroutine task request, it can obtain the number of applications from the coroutine task request, that is, the number of coroutine tasks applied by the threads. Thereafter, the top m coroutine tasks in the global task queue can be distributed to the local task queue according to the sequence, and m is the number of applications. Since the coroutine tasks in the global task queue are sequenced according to the execution priority, when the local task queue of the thread requests coroutine tasks, the coroutine tasks with higher execution priority are given priority for distribution and execution to ensure the priority and efficiency of task execution.

Wherein, after the top m coroutine tasks in the global task queue are distributed to the local task queue, the m coroutine tasks can be removed from the global task queue to facilitate subsequent distribution of other coroutine tasks in the global task queue.

As so, according to said technical solution, scheduling of the coroutine task can be implemented through the global task queue, and the local task queue of the thread, so as to limit the CPU resource occupation by the executor using the coroutine to drive the segmented pipeline model, improving efficiency and concurrency of task execution, and improving the utilization rate of CPU resources.

Figure 8:
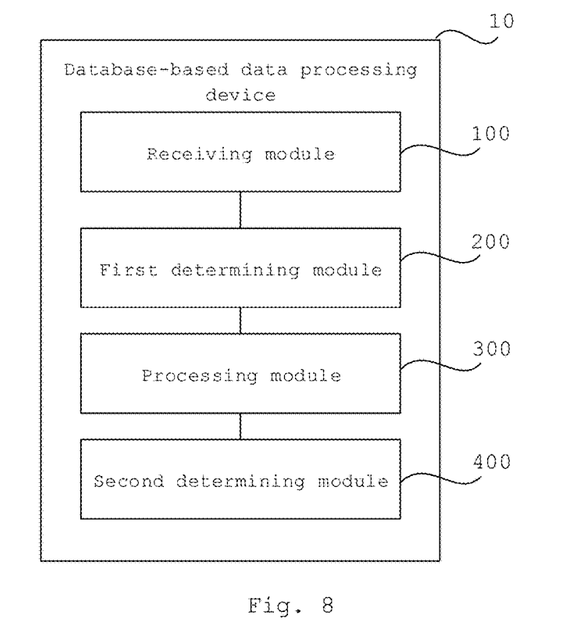
FIG. 8 is a block diagram of a database-based data processing device provided according to an embodiment of the present disclosure.

Based on the same inventive concept, the present disclosure further provides a database-based data processing device, and as shown in FIG. 8, the device 10 includes:
- a receiving module 100 configured to receive a query request task to be executed, and determine a plurality of coroutine tasks corresponding to the query request task, wherein the coroutine tasks are first added to a global task queue shared by a plurality of threads, and then distributed to a local task queue of a corresponding thread from the global task queue;
- a first determining module 200 configured to, in each thread, determine a target coroutine task to be executed according to time information of each coroutine task in the local task queue of the thread;
- a processing module 300 configured to interrupt the target coroutine task and add the target coroutine task to the global task queue when execution of the target coroutine task is not completed and the target coroutine task has been executed in the thread for a current time slice;
- a second determining module 400 configured to, according to the global task queue, and the local task queue of the thread, determine a new target coroutine task for the thread, and executing the new target coroutine task in a next time slice.

Alternatively, the target coroutine task can be added to the global task queue by an adding module, the adding module including:
- a first determining sub-module for determining a cumulative execution time of the target coroutine task and a quota of CPU resources corresponding to the target coroutine task;
- a second determining sub-module for determining an execution parameter of the target coroutine task according to the cumulative execution time and the quota;
- an adding sub-module configured to add the target coroutine task to the global task queue according to the execution parameter.

Optionally, the second determining sub-module is further configured to:
determine a ratio of the cumulative execution time to the quota as the execution parameter.

Optionally, the second determining sub-module includes:
- a third determining sub-module configured to, if there is a coroutine task in the local task queue of the thread, take the coroutine task with the earliest distribution time in the local task queue as the new target coroutine task;
- a fourth determining sub-module configured to, if there is no coroutine task in the local task queue of the thread, apply for a coroutine task from the global task queue to the local task queue, and determine the new target coroutine task from the local task queue with applied coroutine task.

Optionally, coroutine tasks in the global task queue are sequenced from high priority to low priority according to the execution priority.

The fourth determining sub-module includes:
- a sending sub-module configured to send a coroutine task request to the global task queue, wherein the coroutine task request includes the number of applications;
- a processing sub-module configured to add the coroutine task distributed from the global task queue in response to the coroutine task request to the local task queue, wherein the distributed coroutine task includes coroutine tasks with the number of applications selected sequentially based on the sequence in the global task queue.

Optionally, the receiving module is further configured to:
parse the query request task and determine a plurality of operators corresponding to the query request task;
for each operator, if the operator has multiple input operators, the operator and the input operators are divided into different coroutine tasks;
if the operator has one input operator, the operator and the input operator are divided into the same coroutine task.

Optionally, the global task queue is implemented by a red-black tree structure.

Figure 9:
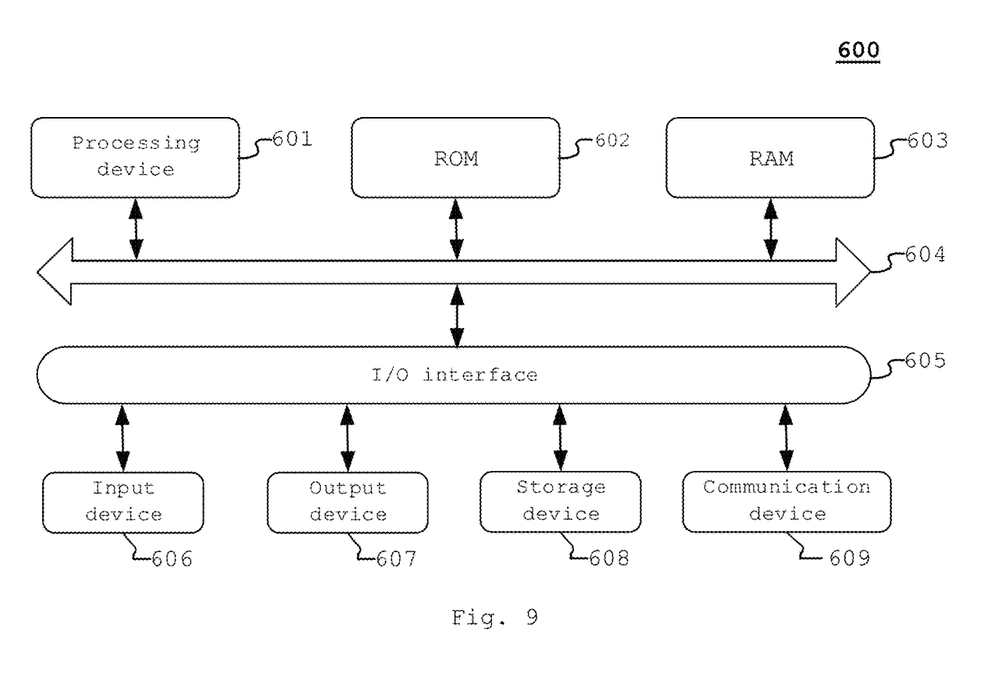
FIG. 9 is a structural schematic diagram of an electronic apparatus adapted for implementing an embodiment of the present disclosure.

Referring now to FIG. 9, there is shown a structural schematic diagram of an electronic apparatus (terminal equipment or server) 600 adapted for implementing an embodiment of the present disclosure. The terminal equipment in the embodiment of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), a vehicle-mounted terminal (such as a vehicle-mounted navigation terminal) and the like, and a fixed terminal such as a digital TV, a desktop computer and the like. The electronic apparatus shown in FIG. 9 is only an example, and should not be construed to limit function and application scope of the embodiment of the present disclosure.

As shown in FIG. 9, an electronic apparatus 600 may include a processing device (e.g., a central processor, a graphics processor, etc.) 601, which may perform various appropriate actions and processes according to a program stored in a read-only memory (ROM) 602 or a program loaded into a random access memory (RAM) 603 from a storage device 608. In the RAM 603, various programs and data required for operation of the electronic apparatus 600 are also stored. The processing device 601, the ROM 602 and the RAM 603 are connected to each other through a bus 604. An input/output (I/O) interface 605 is also connected to the bus 604.

Generally, the following devices can be connected to the I/O interface 605: an input device 606 including, for example, a touch screen, a touch pad, a keyboard, a mouse, a camera, a microphone, an accelerometer, a gyroscope, etc.;

an output device 607 including, for example, a liquid crystal display (LCD), a speaker, a vibrator, etc.; a storage device 608 including, for example, a magnetic tape, a hard disk, etc.; and a communication device 609. The communication device 609 may allow the electronic apparatus 600 to communicate wirelessly or wiredly with other devices to exchange data. Although FIG. 9 shows an electronic apparatus 600 with various devices, it should be understood that it is not required to implement or have all the devices shown. More or fewer devices may alternatively be implemented or provided.

In particular, according to an embodiment of the present disclosure, the process described above with reference to the flowchart can be implemented as a computer software program. For example, the embodiment of the present disclosure includes a computer program product including a computer program carried on a non-transitory computer-readable medium, the computer program including program code for executing the method shown in the flow chart. In such an embodiment, the computer program can be downloaded and installed from the network through the communication device 609, or installed from the storage device 608, or installed from the ROM 602. When the computer program is executed by the processing device 601, the above function defined in the method of the embodiment of the present disclosure is performed.

It should be noted that the computer-readable medium mentioned above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device or unit, or any combination of the above. More examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which program can be used by or in combination with an instruction execution system, device or unit. In the present disclosure, a computer-readable signal medium may include a data signal propagated in baseband or as part of a carrier wave, in which computer-readable program code is carried. This propagated data signal can take many forms, including but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, device or unit. Program code contained in the computer-readable medium can be transmitted by any suitable medium, including but not limited to: a wire, an optical cable, a RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication network include a local area network ("LAN"), a wide area network ("WAN"), an internet (for example, the Internet) and an end-to-end network (for example, ad hoc end-to-end network), as well as any currently known or future developed network.

The computer-readable medium may be included in the electronic device; or it can exist independently without being assembled into the electronic device.

The computer-readable medium carries one or more programs, which, when executed by the electronic apparatus, cause the electronic apparatus to: receive a query request task to be executed, and determine a plurality of coroutine tasks corresponding to the query request task, wherein the coroutine tasks are first added to a global task queue shared by a plurality of threads, and then distributed to a local task queue of a corresponding thread from the global task queue; in each thread, determine a target coroutine task to be executed according to time information of each coroutine task in the local task queue of the thread; interrupt the target coroutine task and add the target coroutine task to the global task queue when execution of the target coroutine task is not completed and the target coroutine task has been executed in the thread for a current time slice; according to the global task queue, and the local task queue of the thread, determine a new target coroutine task for the thread, and executing the new target coroutine task in a next time slice.

Computer program code for performing operations of the present disclosure may be written in one or more programming languages or their combinations, including but not limited to object-oriented programming languages, such as Java, Smalltalk, C++, and conventional procedural programming languages, such as "C" language or similar programming languages. The program code can be completely executed on the computer of the user, partially executed on the computer of the user, executed as an independent software package, partially executed on the computer of the user and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or part of codes that contains one or more executable instructions for implementing a specified logical function. It should also be noted that in some alternative implementations, the function noted in the block may occur in a different order than that noted in the drawing. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

Modules involved in the embodiment described in the present disclosure can be implements by software or hardware. Wherein, the name of the module does not constitute the limitation of the module itself in some cases. For example, the receiving module can also be described as "a module that receives a query request task to be executed and determines a plurality of coroutine tasks corresponding to the query request task".

Functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, device or apparatus. The machine-readable medium may be a machine-readable signal medium or a machine-readable storage medium. A machine-readable medium may include, but is not limited to, an electronic, magnetic, optical, electromagnetic, infrared, or semiconductor system, device or apparatus, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage apparatus, a magnetic storage apparatus, or any suitable combination of the above.

According to one or more embodiments of the present disclosure, example 1 provides a database-based data processing method, wherein the method includes:
  receiving a query request task to be executed, and determining a plurality of coroutine tasks corresponding to the query request task, wherein the coroutine tasks are first added to a global task queue shared by a plurality of threads, and then distributed to a local task queue of a corresponding thread from the global task queue;
  in each thread, determining a target coroutine task to be executed according to time information of each coroutine task in the local task queue of the thread;
  interrupting the target coroutine task and adding the target coroutine task to the global task queue when execution of the target coroutine task is not completed and the target coroutine task has been executed in the thread for a current time slice;
  according to the global task queue, and the local task queue of the thread, determining a new target coroutine task for the thread, and executing the new target coroutine task in a next time slice.

According to one or more embodiments of the present disclosure, example 2 provides the method of example 1, wherein the target coroutine task is added to the global task queue by:
  determining a cumulative execution time of the target coroutine task and a quota of CPU resources corresponding to the target coroutine task;
  determining an execution parameter of the target coroutine task according to the cumulative execution time and the quota;
  adding the target coroutine task to the global task queue according to the execution parameter.

According to one or more embodiments of the present disclosure, example 3 provides the method of example 2, wherein the determining an execution parameter of the target coroutine task according to the cumulative execution time and the quota, includes:
  determining a ratio of the cumulative execution time to the quota as the execution parameter.

According to one or more embodiments of the present disclosure, example 4 provides the method of example 1, wherein the determining a new target coroutine task for the thread according to the global task queue, and the local task queue of the thread, includes:
  if there is a coroutine task in the local task queue of the thread, taking the coroutine task with the earliest distribution time in the local task queue as the new target coroutine task;
  if there is no coroutine task in the local task queue of the thread, applying for a coroutine task from the global task queue to the local task queue, and determining the new target coroutine task from the local task queue with applied coroutine task.

According to one or more embodiments of the present disclosure, example 5 provides the method of example 4, wherein, coroutine tasks in the global task queue are sequenced from high priority to low priority according to the execution priority;
  the applying for a coroutine task from the global task queue to the local task queue, includes:
  sending a coroutine task request to the global task queue, wherein the coroutine task request includes the number of applications;
  adding the coroutine task distributed from the global task queue in response to the coroutine task request to the local task queue, wherein the distributed coroutine task includes coroutine tasks in the number of applications selected sequentially based on the sequence in the global task queue.

According to one or more embodiments of the present disclosure, example 6 provides the method of example 1, wherein the determining a plurality of coroutine tasks corresponding to the query request task, includes:
  parsing the query request task and determining a plurality of operators corresponding to the query request task;
  for each operator, if the operator has multiple input operators, the operator and the input operators are divided into different coroutine tasks;
  if the operator has one input operator, the operator and the input operator are divided into the same coroutine task.

According to one or more embodiments of the present disclosure, example 7 provides the method of any one of examples 1-6, wherein, the global task queue is implemented by a red-black tree structure.

According to one or more embodiments of the present disclosure, example 8 provides a database-based data processing device, wherein the device includes:
  a receiving module configured to receive a query request task to be executed, and determine a plurality of coroutine tasks corresponding to the query request task, wherein the coroutine tasks are first added to a global task queue shared by a plurality of threads, and then distributed to a local task queue of a corresponding thread from the global task queue;
  a first determining module configured to, in each thread, determine a target coroutine task to be executed according to time information of each coroutine task in the local task queue of the thread;
  a processing module configured to interrupt the target coroutine task and add the target coroutine task to the global task queue when execution of the target coroutine task is not completed and the target coroutine task has been executed in the thread for a current time slice;

a second determining module configured to, according to the global task queue, and the local task queue of the thread, determine a new target coroutine task for the thread, and executing the new target coroutine task in a next time slice.

According to one or more embodiments of the present disclosure, example 9 provides a computer-readable storage medium, on which a computer program is stored, and the computer program, when executed by a processing device, implement steps of the method of any one of examples 1-7.

According to one or more embodiments of the present disclosure, example 10 provides an electronic apparatus, including:

a storage device on which a computer program is stored;

a processing device for executing the computer program in the storage device to implement steps of the method of any one of examples 1-7.

The above description is only the preferred embodiments of the present disclosure and the explanation of the applied technical principles. It should be understood by those skilled in the art that the disclosed scope involved in the present disclosure is not limited to technical solutions formed by specific combinations of the above technical features, but also covers other technical solutions formed by any combinations of the above technical features or their equivalent features without departing from the above disclosed concept, such as technical solutions formed by replacing the above features with (but not limited to) technical features with similar functions disclosed in the present disclosure.

Furthermore, although operations are depicted in a particular order, this should not be understood as requiring that these operations be performed in the particular order shown or in a sequential order. In a determined circumstance, multitasking and parallel processing may be advantageous. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical actions, it should be understood that the subject matter defined in the appended claims is not necessarily limited to the specific features or actions described above. On the contrary, specific features and actions described above are only exemplary forms of implementing the claims. With regard to the device in the above embodiment, the specific manners in which modules perform operations have been described in detail in the embodiments related with the method, and will not be described in detail here.

What is claimed is:

1. A database-based data processing method, comprising:
   receiving a query request task to be executed, and determining a plurality of coroutine tasks corresponding to the query request task, wherein the coroutine tasks are first added to a global task queue shared by a plurality of threads, and then distributed to a local task queue of a corresponding thread from the global task queue;
   in each thread, determining a target coroutine task to be executed according to time information of each coroutine task in the local task queue of the thread;
   interrupting the target coroutine task and adding the target coroutine task to the global task queue when execution of the target coroutine task is not completed and the target coroutine task has been executed in the thread for a current time slice; and
   according to the global task queue, and the local task queue of the thread, determining a new target coroutine task for the thread, and executing the new target coroutine task in a next time slice.

2. The method according to claim 1, wherein the target coroutine task is added to the global task queue by:
   determining a cumulative execution time of the target coroutine task and a quota of CPU resources corresponding to the target coroutine task;
   determining an execution parameter of the target coroutine task according to the cumulative execution time and the quota; and
   adding the target coroutine task to the global task queue according to the execution parameter.

3. The method according to claim 2, wherein the determining an execution parameter of the target coroutine task according to the cumulative execution time and the quota comprises:
   determining a ratio of the cumulative execution time to the quota as the execution parameter.

4. The method according to claim 1, wherein the according to the global task queue, and the local task queue of the thread, determining a new target coroutine task for the thread comprises:
   in response to that there is a coroutine task in the local task queue of the thread, taking the coroutine task with earliest distribution time in the local task queue as the new target coroutine task; and
   in response to that there is no coroutine task in the local task queue of the thread, applying for a coroutine task from the global task queue to the local task queue, and determining the new target coroutine task from the local task queue with applied coroutine task.

5. The method according to claim 4, wherein coroutine tasks in the global task queue are sequenced from high priority to low priority according to the execution priority; and
   the applying for a coroutine task from the global task queue to the local task queue comprises:
   sending a coroutine task request to the global task queue, wherein the coroutine task request comprises number of applications; and
   adding the coroutine task distributed from the global task queue in response to the coroutine task request to the local task queue, wherein the distributed coroutine task comprises coroutine tasks with the number of applications selected sequentially based on the sequence in the global task queue.

6. The method according to claim 1, wherein the determining a plurality of coroutine tasks corresponding to the query request task comprises:
   parsing the query request task and determining a plurality of operators corresponding to the query request task;
   for each operator, if the operator has multiple input operators, the operator and the input operators are divided into different coroutine tasks; and
   if the operator has one input operator, the operator and the input operator are divided into the same coroutine task.

7. The method according to claim 1, wherein the global task queue is implemented by a red-black tree structure.

8. A non-transitory computer-readable medium, on which a computer program is stored, wherein the computer program, when executed by a processing device, is configured to:
- receive a query request task to be executed, and determine a plurality of coroutine tasks corresponding to the query request task, wherein the coroutine tasks are first added to a global task queue shared by a plurality of threads, and then distributed to a local task queue of a corresponding thread from the global task queue;
- in each thread, determine a target coroutine task to be executed according to time information of each coroutine task in the local task queue of the thread;
- interrupt the target coroutine task and add the target coroutine task to the global task queue when execution of the target coroutine task is not completed and the target coroutine task has been executed in the thread for a current time slice; and
- according to the global task queue, and the local task queue of the thread, determine a new target coroutine task for the thread, and execute the new target coroutine task in a next time slice.

9. The non-transitory computer-readable medium according to claim 8, wherein the computer program, when executed by a processing device, is further configured to:
- determine a cumulative execution time of the target coroutine task and a quota of CPU resources corresponding to the target coroutine task;
- determine an execution parameter of the target coroutine task according to the cumulative execution time and the quota; and
- add the target coroutine task to the global task queue according to the execution parameter.

10. The non-transitory computer-readable medium according to claim 9, wherein the computer program, when executed by a processing device, is further configured to:
- determine a ratio of the cumulative execution time to the quota as the execution parameter.

11. The non-transitory computer-readable medium according to claim 8, wherein the computer program, when executed by a processing device, is further configured to:
- in response to that there is a coroutine task in the local task queue of the thread, take the coroutine task with earliest distribution time in the local task queue as the new target coroutine task; and
- in response to that there is no coroutine task in the local task queue of the thread, apply for a coroutine task from the global task queue to the local task queue, and determine the new target coroutine task from the local task queue with applied coroutine task.

12. The non-transitory computer-readable medium according to claim 11, wherein coroutine tasks in the global task queue are sequenced from high priority to low priority according to the execution priority; and
- the computer program, when executed by a processing device, is further configured to:
- send a coroutine task request to the global task queue, wherein the coroutine task request comprises number of applications; and
- add the coroutine task distributed from the global task queue in response to the coroutine task request to the local task queue, wherein the distributed coroutine task comprises coroutine tasks with the number of applications selected sequentially based on the sequence in the global task queue.

13. The non-transitory computer-readable medium according to claim 8, wherein the computer program, when executed by a processing device, is further configured to:
- parse the query request task and determine a plurality of operators corresponding to the query request task;
- for each operator, if the operator has multiple input operators, the operator and the input operators are divided into different coroutine tasks; and
- if the operator has one input operator, the operator and the input operator are divided into the same coroutine task.

14. An electronic apparatus comprising:
- a storage device on which a computer program is stored;
- a processing device, when executing the computer program in the storage device, the processing device is configured to
- receive a query request task to be executed, and determine a plurality of coroutine tasks corresponding to the query request task, wherein the coroutine tasks are first added to a global task queue shared by a plurality of threads, and then distributed to a local task queue of a corresponding thread from the global task queue;
- in each thread, determine a target coroutine task to be executed according to time information of each coroutine task in the local task queue of the thread;
- interrupt the target coroutine task and add the target coroutine task to the global task queue when execution of the target coroutine task is not completed and the target coroutine task has been executed in the thread for a current time slice; and
- according to the global task queue, and the local task queue of the thread, determine a new target coroutine task for the thread, and execute the new target coroutine task in a next time slice.

15. The electronic apparatus according to claim 14, wherein the processing device is further configured to:
- determine a cumulative execution time of the target coroutine task and a quota of CPU resources corresponding to the target coroutine task;
- determine an execution parameter of the target coroutine task according to the cumulative execution time and the quota; and
- add the target coroutine task to the global task queue according to the execution parameter.

16. The electronic apparatus according to claim 15, wherein the processing device is further configured to:
- determine a ratio of the cumulative execution time to the quota as the execution parameter.

17. The electronic apparatus according to claim 14, wherein the processing device is further configured to:
- in response to that there is a coroutine task in the local task queue of the thread, take the coroutine task with earliest distribution time in the local task queue as the new target coroutine task; and
- in response to that there is no coroutine task in the local task queue of the thread, apply for a coroutine task from the global task queue to the local task queue, and determine the new target coroutine task from the local task queue with applied coroutine task.

18. The electronic apparatus according to claim 17, wherein coroutine tasks in the global task queue are sequenced from high priority to low priority according to the execution priority; and
- the processing device is further configured to:
- send a coroutine task request to the global task queue, wherein the coroutine task request comprises number of applications; and add the coroutine task distributed from the global task queue in response to the coroutine task request to the local task queue, wherein the distributed coroutine task comprises coroutine tasks with the number of applications selected sequentially based on the sequence in the global task queue.

19. The electronic apparatus according to claim 14, wherein the processing device is further configured to:
parse the query request task and determine a plurality of operators corresponding to the query request task;
for each operator, if the operator has multiple input operators, the operator and the input operators are divided into different coroutine tasks; and
if the operator has one input operator, the operator and the input operator are divided into the same coroutine task.

20. The electronic apparatus according to claim 14, wherein the global task queue is implemented by a red-black tree structure.

* * * * *